Figure 4:
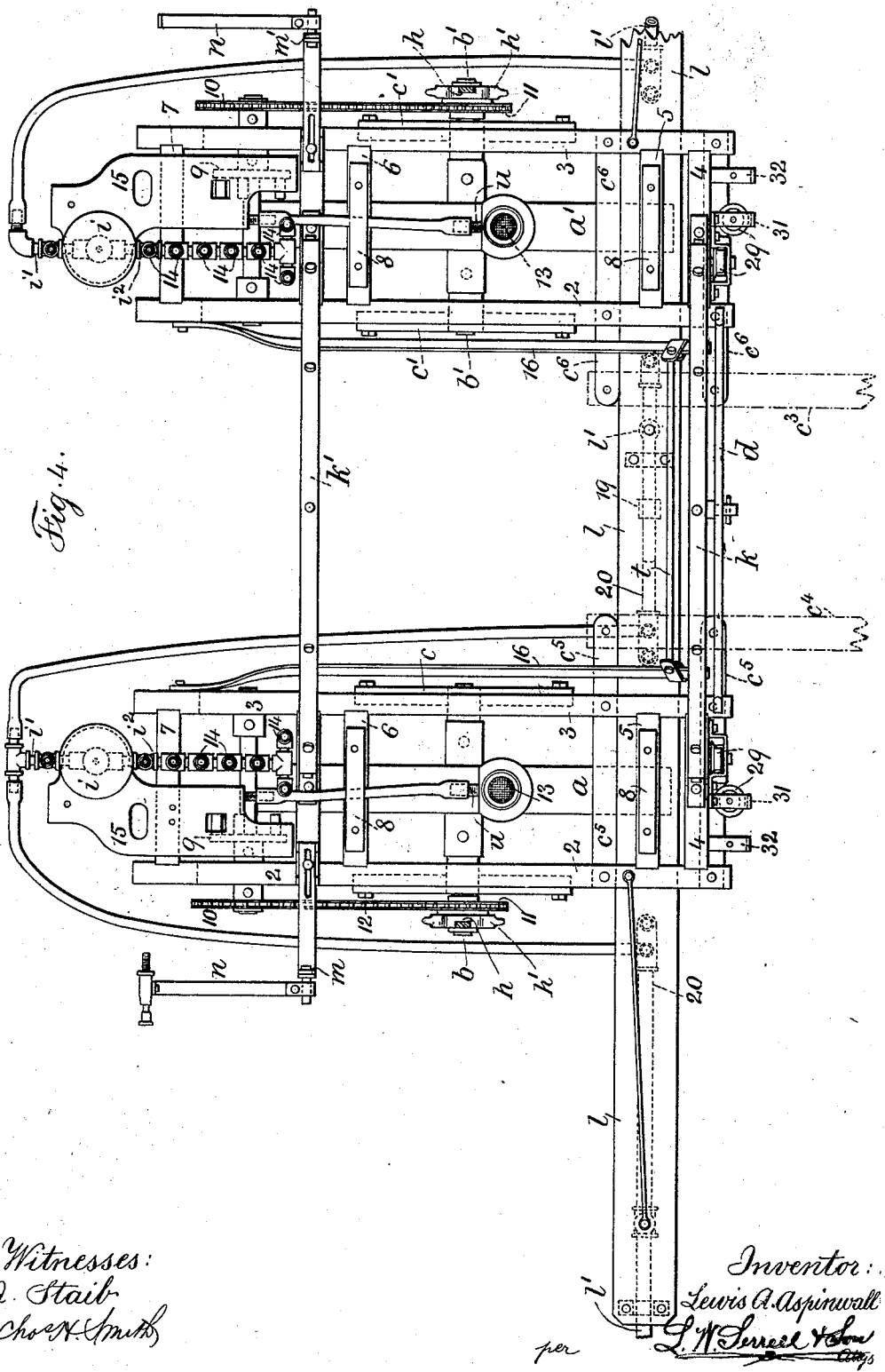

No. 717,314. Patented Dec. 30, 1902.
L. A. ASPINWALL.
LIQUID SPRAYER.
(Application filed Feb. 3, 1902.)
(No Model.) 4 Sheets—Sheet 1.
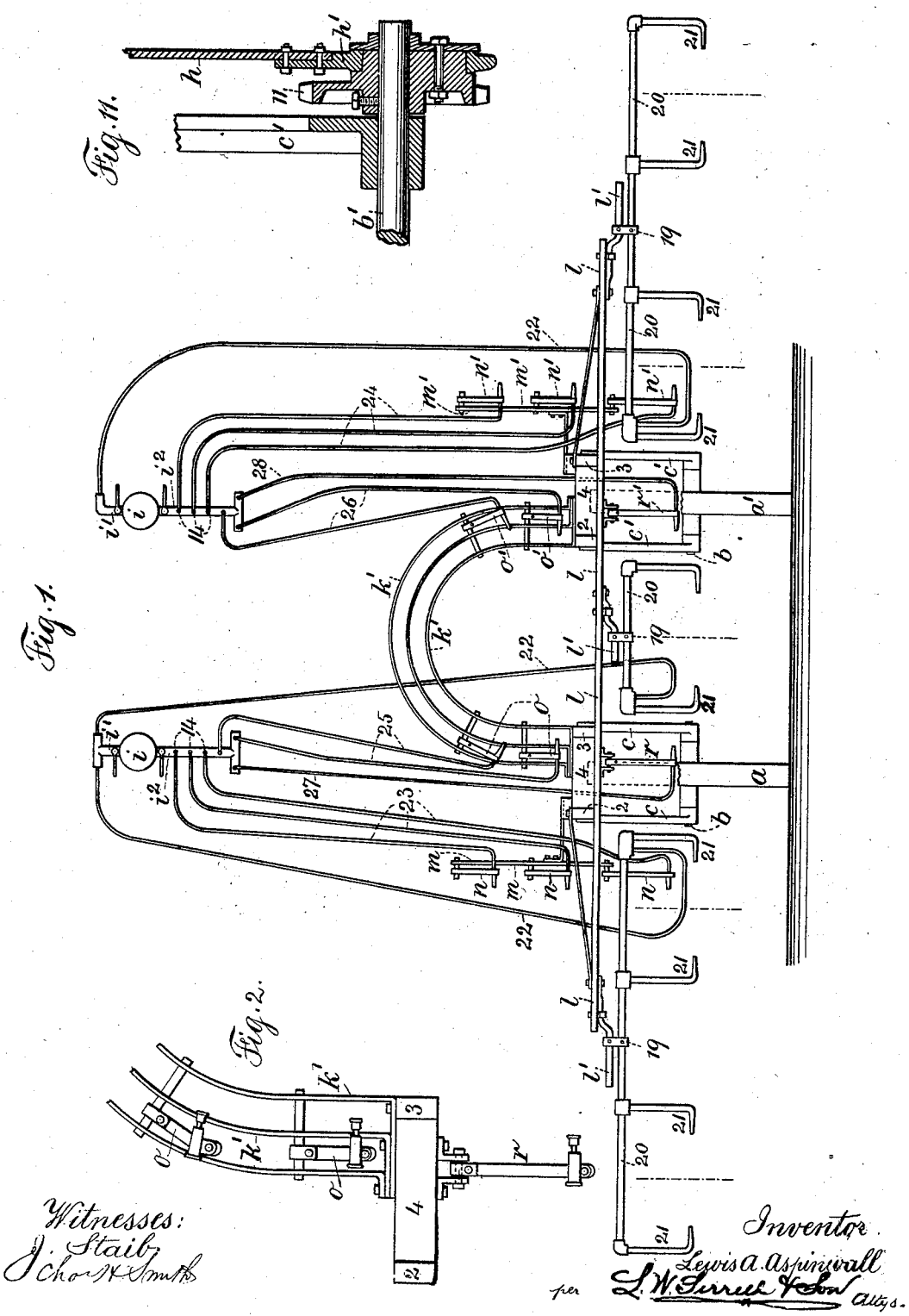

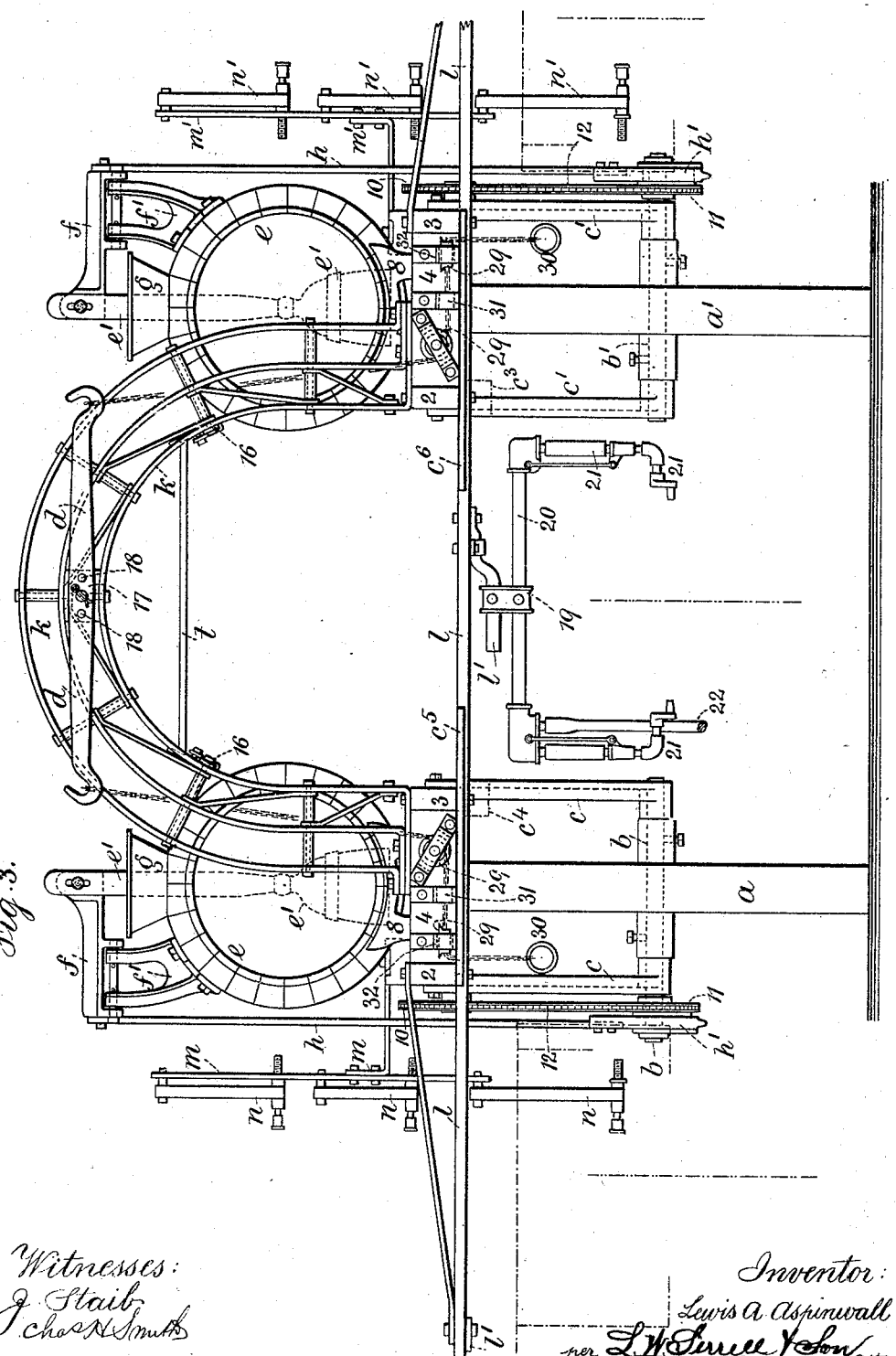

No. 717,314. Patented Dec. 30, 1902.
L. A. ASPINWALL.
LIQUID SPRAYER.
(Application filed Feb. 3, 1902.)
(No Model.) 4 Sheets—Sheet 3.

Witnesses:
J. Staib
Chos. H. Smith

Inventor:
Lewis A. Aspinwall
per L. W. Serrell & Son
Attys

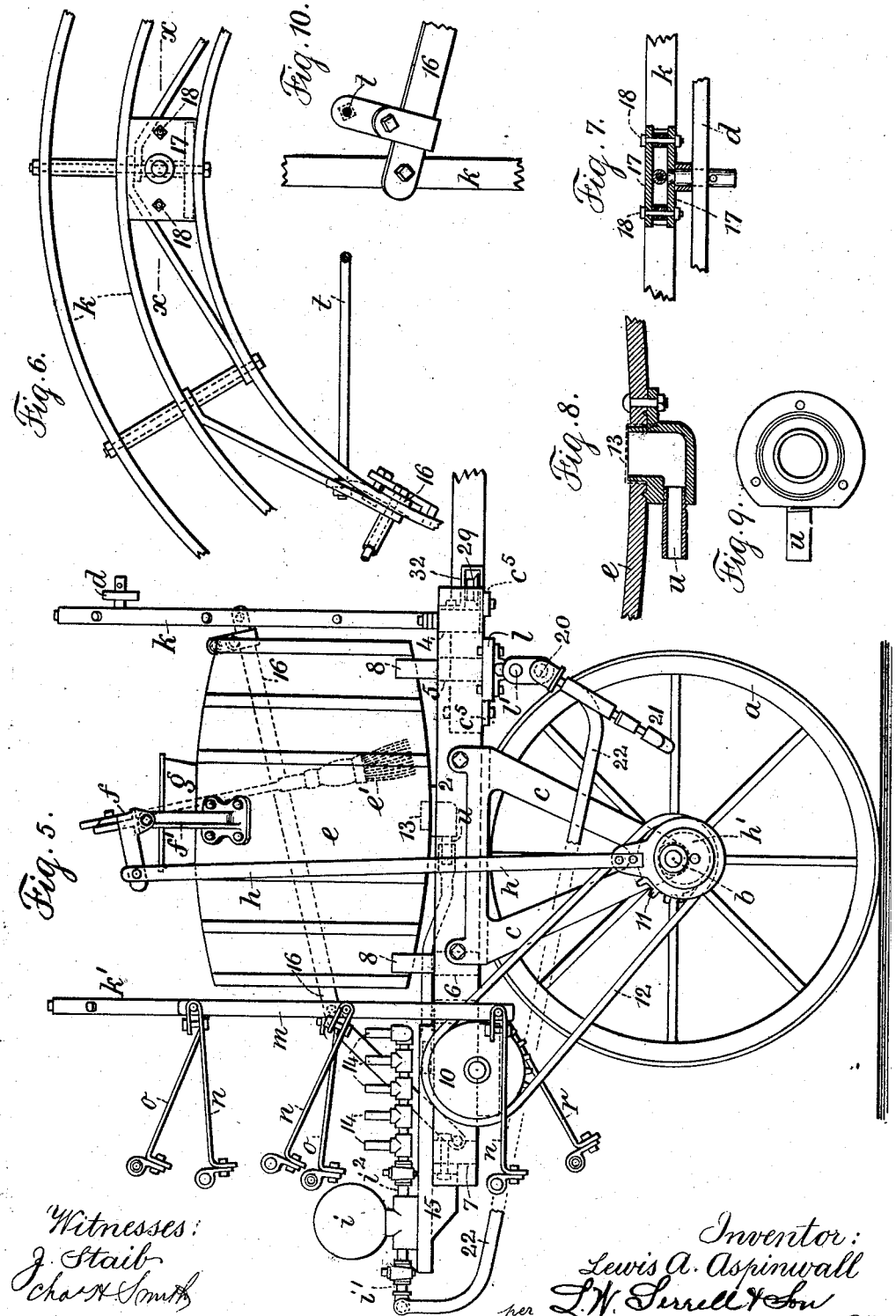

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

LIQUID-SPRAYER.

SPECIFICATION forming part of Letters Patent No. 717,314, dated December 30, 1902.

Application filed February 3, 1902. Serial No. 92,237. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Liquid-Sprayers, of which the following is a specification.

My present invention is an improvement upon the devices shown and described in my Patent No. 653,333, July 10, 1900, and the present device includes some of the features shown and described therein.

The device of my present invention, while applicable for general purposes of liquid-spraying and suitable for general agricultural purposes in spraying plants or growing vegetables, is specially applicable for spraying cotton-plants, both when the plants are young and as growing and when fully grown, portions of the mechanism being specially employed with the young plants and other portions specially with the plants when of larger growth, and to accommodate the machine to these conditions part of the mechanism is removable after its use with the small plants and is no longer required when the machine is applicable for plants of a larger growth.

In carrying out my invention I employ a double or two-part structure—that is, a device where the one part is a duplicate of the other—the two parts being connected in a fixed relation by trusses that are large enough and extend high enough to reach over a central row of plants, the parts of the structure being independently mounted on single wheels and adapted to travel in the adjoining spaces between three rows of plants. I employ series of discharge-orifices in the pipes from the air-chambers and series of flexible pipes extending in different directions and connected thereto. I also employ adjustable spray-nozzles in rows as high as five for spraying the young plants, the spraying-nozzles coming on opposite sides of the rows, and I further employ other adjustable spray-nozzles for spraying one row upon opposite sides and the row at either side upon the adjacent sides. These latter spraying devices are employed for spraying older and tall plants when the devices for spraying the young plants are dispensed with, and in this way the machine is adapted for continuous use with the growth of the plants and is not put out of service because of the growth of the plants. I further employ a cross-rod within one of the trusses, the office of which is to agitate the bushes or plants and set them in motion as they are being sprayed to facilitate the spraying liquid getting at all parts of the leaves and stems of the plants. The liquid-holding barrels in the present device are carried directly over the wheels, which is a special advantage on rough or hilly ground. Two horses are advantageously employed with this device, the same walking on either side of the central row of plants, and an evener device is employed in connection with the apparatus, so as to regulate the draft.

In the drawings, Figure 1 is a diagrammatic view representing the devices of my invention. Fig. 2 is a partial elevation of the end of one frame and a part of one of the trusses and details of supporting a series of arms and spraying-nozzles. Fig. 3 is a front elevation representing the device. Fig. 4 is a plan with the barrels removed. Fig. 5 is a side elevation. Fig. 6 is a view of a portion of the upper part of the front truss. Fig. 7 is a sectional plan at *x x* of Fig. 6 through the pivot connection of the evener. Fig. 8 is a longitudinal section, and Fig. 9 a plan, of the strainer device in the bottom of the liquid-holding barrel. Fig. 10 is a section of the agitating-rod and an elevation of the connection thereof to the forward truss, and Fig. 11 is a cross-section of the connection of an eccentric and sprocket-wheel to the axle of one of the supporting-wheels.

$a$ $a'$ represent the wheels upon axles $b$ $b'$. There are pairs of frames each composed of side bars 2 3 and transverse bars 4 5 6 7, and brackets in pairs $c$ $c'$ are connected to the side bars of the respective frames and extend downward therefrom to the axles of the wheels, the said frames, wheels, axles, and brackets comprising two structures substantially identical. I form two trusses $k$ $k'$ of parallel concentric bars of partly-curved and partly-straight configuration. These are connected together by radial bars, and the ends of the parts forming the trusses preferably overlap and are at right angles to the other parts thereof, so as to rest upon parts of the said frames and be bolted thereto, the trusses securely connecting the said frames as two parts of a structure together, each part having a single wheel, the wheels supporting the weight of the structure independent of any action of the trusses and the trusses simply forming a connecting-link. These trusses rise to an appreciable height, so as to be able to pass over any plants that it may be desired to spray. Each of the frame structures carries brackets 8 for supporting the water-barrels $e$, so that the said water-barrels are directly over the wheels and are arranged longitudinally of the frames. Each water-barrel is advantageously provided with a paddle $e'$ or equivalent liquid-stirring device. This may be in the form of a broom, which in its back-and-forth movement brushes over the strainer 13 to keep it free from obstructions. A rocking support $f$ is carried by a bracket $f'$ on the top of each barrel, and there is also on the top of each barrel a filling-hopper $g$, through which the paddle $e'$ passes. The arms $h$ connect at their upper ends to the rocking supports $f$ and at their lower ends to eccentrics $h'$ on the axles $b\ b'$, so that with the rotation of the wheels, their axles, and the said eccentrics the rocking supports $f$ are swung on the brackets $f'$ to impart to the paddles a forward and backward movement in the liquid for agitating the same.

I employ devices similar to those described in my Patent No. 655,333—that is, platforms 15, carried by the frames, air-chambers $i$ upon the platforms, pipes $i'\ i^2$, extending in opposite directions from the air-chambers, and disks 9 with pins on revoluble shafts for actuating the pump mechanism—and while said pump mechanism is not shown in the present case it is the same as employed by me in said Letters Patent. There are sprockets 10 and 11, one on the shafts of the disks 9 and the other on the axles of the wheels, and chain belts 12 pass around the sprockets to effect the operations of the pump. I employ strainers 13, and coupling-heads in the bottoms of the liquid-holding barrels and pipes $u$ from the couplings extend to the pumping mechanism, and, as shown in said Letters Patent, there are of necessity pipes from the pumps to the air-chambers. In the pipes $i'\ i^2$ there are discharge-orifices 14, and from these discharge-orifices extend flexible hose 22, 23, 24, 25, 26, 27, and 28, as hereinafter set forth.

I provide a removable cross-board $l$, extending across the front of the machine and supported by the two-part structure or frames and extending at either side beyond the same, the supporting details for connecting the same to the structure being unimportant. The same, however, is removably connected and may be disconnected with facility when not required.

By reference to Figs. 1, 3, and 5 I provide arms $l'$ of bent form and securely fastened to the central and end portions of the said cross-board. These arms are provided with couplings 19, and the same support pipes 20 for liquid. The pipes 20 carry series of arms and spray-nozzles 21, which arms and nozzles supply the liquid for the spraying purposes. The pipes 20 and the arms and spraying-nozzles are preferably those employed in my aforesaid patent. The flexible hose 22 extend from rearward of the air-chambers to coupling-heads or suitable connecting devices forming part of the pipes 20, so that the three hose, as shown especially in the diagram Fig. 1, supply liquid for ten spraying-nozzles. These nozzles are arranged in five pairs and collectively may be readily adjusted at the couplings 19 and arms $l'$. It will be noticed that these spraying-nozzles are in pairs oppositely placed, and they are therefore capable of spraying five rows of plants simultaneously. This is specially advantageous and economical in practice in spraying young cotton-plants.

I employ uprights $m\ m'$, connected by brackets to the frame parts 2 3, and these uprights carry series of pivoted arms $n\ n'$, with spray-nozzles at their ends. I also employ series of pivoted arms $o\ o'$, with spray-nozzles at their ends. The latter series of pivoted arms are supported by the rear truss-frame $k'$. I also employ pivoted arms $r\ r'$, with spray-nozzles at their ends, and these arms are pivotally connected to the under sides of the frames of the two-part structure. The spray-nozzles of the arms $o\ o'$ and $r\ r'$ are in opposition—that is, they point toward one another—and the spray-nozzles of the series of arms $n\ n'$ point outwardly and away from one another. The flexible hose 23 and 24 from the discharge-orifices 14 pass to the nozzles of the arms $n\ n'$, the flexible hose 25 26 pass to the spray-nozzles of the arms $o\ o'$, and the flexible hose 27 28 extend to the spray-nozzles of the arms $r\ r'$. It will be noticed from the diagram that the flexible hose 22, in three lengths and which extend to the spray-nozzles of the series of arms 21, are connected to the discharge-orifices of the pipes $i'$ and that all of the other flexible hose are connected to the discharge-orifices of the pipes $i^2$, and these pipes are provided with cocks for closing off the water at either side of the air-chambers. Consequently when the spray-nozzles of the series of arms 21, and which are supported by the removable cross-board $l$, are being employed for spraying young cotton-plants the other spraying devices are not employed, but are idle parts of the machine. As the cotton-plants grow and are too large for these spraying devices the cross-board $l$, with the arms $l'$, series of pipes 20, and the series of arms 21, with their spray-nozzles, and the hose 22 are advantageously removed from the machine. This of course reduces the capacity of the machine in its effectiveness upon a given number of rows of plants, but the same is compensated for by the greater requirements as the plants grow in height. With the taller plants and with plants up to the full growth the series of pivoted arms and spray-nozzles $n$ $n'$, $o$ $o'$, and $r$ $r'$ are employed in spraying opposite sides of a central row of plants, or, in other words, a row between the wheels of the apparatus and the adjacent sides of the next two rows.

I employ brace-bars 16, inclined rearwardly and at their forward ends connected to the forward truss $k$ and at their rear ends to the truss $k'$ and the side bars of the two-part structure, and connected to these brace-bars is a cross-rod $t$. This is advantageously carried by clips surrounding and adapted to be clamped upon the brace-bars 16. It will be noticed that the nearer the bar $t$ is to the front truss the greater is also its height from the ground and that the same will come nearer to the ground as moved rearward. In this way an adjustment is effected, the object of this bar being to come in contact with the tops of the plants as the same move beneath the forward truss, so as to agitate the upper leaves and stems and cause a movement thereof while the sprayers are wetting the plants with the liquid contents of the barrels. This permits the spraying liquid to have full access in wetting the leaves and stems.

I provide a draft-evener $d$, the equivalent of an ordinary whiffletree. This is pivoted to the forward truss at the upper portion thereof, and at this point plates 17 are located between the bars of the truss and are connected to the bars by bolts 18, the forward plate having a hub to which is connected a pin for the draft-evener, and chains extend from the ends of the draft-evener around pulleys 29 and terminate in rings 30, to which the devices connected with the harness of the horses are secured.

In connection with my present improved machine it is desirable to be able to place the horses at the proper distance apart, according to the actual distance between the rows of plants, and to accomplish this it is of course necessary to shift the shafts $c^3$ $c^4$. In Fig. 3 the shafts $c^3$ $c^4$ (indicated in dotted lines) are shown as attached under the side pieces 2 and 3 of the frames, while in Figs. 4 and 5 the shafts are shown as attached at the inner ends of pairs of bars $c^5$ and $c^6$, that are fastened to the frames. In these latter figures the shafts are also shown by dotted lines.

I provide, as shown in Figs. 3 and 4, strap-bearings 31 32, duplicated upon the two similar frame structures, and which strap-bearings are adapted to receive the outermost of the pulleys 29. In the position of the shafts $c^3$ $c^4$ in Fig. 3 the outermost pulleys 29 are in the strap-frames 32, and in this figure the chains from the evener are passed over the fixed pulleys 29 and over the outermost pulleys 29 in the strap-bearings 32, as in this position the shafts $c^3$ and $c^4$ are farthest apart. In Figs. 4 and 5 the shafts $c^3$ and $c^4$ are nearer together, and in this case the outermost pulleys 29 are shifted to the strap-bearings 31. In this manner the rings 30 at the ends of the chains are brought into their proper relation to the shafts $c^3$ $c^4$, so that the whiffletrees for the traces will be connected thereto and the horses be in their proper relation to the shafts.

I claim as my invention—

1. In a liquid-sprayer, the combination with the air-chamber and adjacent main liquid-holding pipe fed by the liquid-supply, a series of orifices connected with the main liquid-holding pipe, and a series of flexible hose extending from said orifices, of uprights supported upon the frame of the machine and upon the outsides thereof and arranged vertically, series of arms carrying spray-nozzles and pivoted to said uprights so as to swing and to which the said series of flexible hose are connected, substantially as set forth.

2. In a liquid-sprayer, the combination with the air-chamber and adjacent main liquid-holding pipe fed by the liquid-supply, a series of orifices connected with said main pipe and a series of flexible hose extending from said orifices, of uprights supported upon the frame of the machine and upon the outsides thereof and arranged vertically, series of arms carrying spray-nozzles and pivoted to said uprights so as to swing and to which the said series of flexible hose are connected, and other series of pivoted arms carrying spray-nozzles pointing toward one another and flexible hose extending from the said orifices to the said spray-nozzles, whereby opposite sides of a row of plants and the opposing faces of adjacent rows of plants are simultaneously sprayed, substantially as set forth.

3. A liquid-spraying device comprising two similar frame structures, a wheel, axle and pair of brackets to each frame structure for supporting the same, a liquid-holding barrel upon each structure, a connection from one structure to the other for firmly uniting the same, so that they move as one, a series of pivoted arms and spray-nozzles carried by said structures for throwing liquid in opposite directions, pump devices carried upon said structures and pipes for liquid with discharge-orifices and flexible hose therefrom to the various spray-nozzles, substantially as set forth.

4. A liquid-spraying device comprising two similar frame structures, a wheel, axle and pair of brackets to each frame structure for supporting the same, a liquid-holding barrel upon each structure, a connection from one structure to the other for firmly uniting the same so that they move as one, a series of arms and spray-nozzles and flexible hose therefrom to the pumping devices and a removable support for said series of arms upon the front of the machine whereby said device is adapted for spraying a number of rows of young plants, substantially as set forth.

5. A liquid-spraying device comprising two similar frame structures, a wheel, axle and pair of brackets to each frame structure for supporting the same, a liquid-holding barrel upon each structure, trusses connecting the two frame structures and arched over so as to firmly connect the two structures as one, uprights arranged upon the outsides of the frame structures, series of arms pivoted thereto and connected spraying-nozzles, arms pivoted to one of the said trusses and connected spraying-nozzles and other arms pivoted to the under side of said frame structures and having nozzles, and series of flexible hose extending from the pipes holding liquid and extending to the spraying-nozzles for delivering spraying liquid upon opposite sides of a row of plants and the opposing faces of adjacent rows, substantially as set forth.

6. A liquid-spraying device comprising two similar frame structures, a wheel, axle and pair of brackets to each frame structure for supporting the same, a liquid-holding barrel upon each structure, trusses connecting the two frame structures and arched over from one to the other so as to firmly connect the two structures as one, whereby the said trusses straddle a row of plants of large size and pass over the same, and means substantially as set forth for causing an agitation or movement of the tops of the plants to facilitate the spraying operations, substantially as set forth.

7. A liquid-spraying device comprising two similar frame structures, a wheel, axle and pair of brackets to each frame structure for supporting the same, a liquid-holding barrel upon each structure, trusses connecting the two frame structures and arched over from one to the other so as to firmly connect the two structures as one, whereby the said trusses straddle a row of plants of large size and pass over the same, and braces connected at their forward ends to the forward truss and extending rearwardly and inclined downwardly, and a cross-bar adjustably connected to said braces and extending across the opening within the trusses for the purpose of agitating or moving the tops of plants with the movement of the apparatus, whereby the spraying is facilitated, substantially as set forth.

8. A liquid-spraying device comprising two similar frame structures, a wheel, axle and pair of brackets to each frame structure for supporting the same, a liquid-holding barrel upon each structure, a connection from one structure to the other for firmly uniting the same so that they move as one, and braces connected at their forward ends to the forward truss and extending rearwardly and inclined downwardly, and a cross-bar adjustably connected to said braces and extending across the opening within the trusses for the purpose of agitating or moving the tops of the plants with the movement of the apparatus, whereby the spraying is facilitated, a pole connected to each structure and the poles independent of one another, a draft-evener $d$ and means for pivotally connecting the same to one of the devices connecting the structures, and connections from the ends of the draft-evener adapted to be engaged by the harness of the horses whereby two horses may be employed in the spaces between three rows of plants and the apparatus pass over one central row of plants, and means connected to the apparatus for spraying the rows, substantially as set forth.

9. A liquid-spraying device consisting of two similar structures separated at an appreciable distance and each comprising a wheel, an axle, a liquid-holding barrel and supports therefor from said axles, and trusses rigidly connecting said similar structures and arched over from one to the other so as to both firmly connect said structures as one and to straddle a row of plants of larger size and pass over the same in use, substantially as specified.

Signed by me this 18th day of December, 1901.

LEWIS AUGUSTUS ASPINWALL.

Witnesses:
W. C. SHANAFELT,
GEO. N. WHITNEY.